United States Patent [19]
Wu

[11] Patent Number: 5,518,216
[45] Date of Patent: May 21, 1996

[54] DIRECTION AND AN ANGLE ADJUSTMENT APPARATUS FOR A VIDEO DISPLAY DEVICE

[75] Inventor: Chen-Sheng Wu, Taoyuan, Taiwan

[73] Assignee: Acer Peripherals, Inc., Taoyuan, Taiwan

[21] Appl. No.: 147,628

[22] Filed: Nov. 5, 1993

[51] Int. Cl.⁶ ..................................................... A47G 29/00
[52] U.S. Cl. ........................ 248/371; 248/349.1; 248/921; 248/923
[58] Field of Search ...................................... 248/371, 398, 248/346, 349, 425, 921, 922, 923, 919

[56] References Cited

U.S. PATENT DOCUMENTS

| | | | |
|---|---|---|---|
| 4,494,720 | 1/1985 | Gregory et al. | 248/371 |
| 4,533,105 | 8/1985 | Cornwell, Jr. et al. | 248/371 |
| 4,564,166 | 1/1986 | Craft et al. | 248/349 |
| 4,589,713 | 5/1986 | Pfuhl et al. | 248/349 X |
| 4,645,153 | 2/1987 | Granzow et al. | 248/921 X |
| 4,738,422 | 4/1988 | Matheson et al. | 248/921 X |
| 4,880,191 | 11/1989 | Lake, Jr. | 248/923 X |
| 5,102,082 | 4/1992 | Bang | 248/921 X |
| 5,145,134 | 9/1992 | Hashimoto | 248/923 X |
| 5,149,043 | 9/1992 | Grundmann | 248/349 |
| 5,209,446 | 5/1993 | Kawai | 248/923 X |

OTHER PUBLICATIONS

IBM Technical Disclosure Bulletin Lowrie & Thorpe—vol. 24 No. 1A Jun. 1981.

Primary Examiner—Ramon O. Ramirez
Assistant Examiner—Derek J. Berger
Attorney, Agent, or Firm—Fish & Richardson

[57] ABSTRACT

A direction adjustment and an angle adjustment apparatus for a video display device are disclosed. The direction adjustment apparatus comprises an upper support and a lower support. The upper support has a bottom which has a plurality of cavities each of which accommodates a roller. The lower support is rotationally connected to the upper support. The lower support has at least a circular guide rail for seating and guiding the roller. The weight of the video display device is transmitted to the circular guide rail of the lower support through the upper support and the roller, and when the upper support is rotated as a result of the direction adjustment of the video display device, the roller is rolling within the circular guide rail of the lower support. The angle adjustment apparatus comprises an upper support, an angle adjustment device and a connecting device. The upper support has a top of a concave shape which has a plurality of cavities each of which accommodates a roller. The angle adjustment device has a bottom of a convex shape which is seated on the roller of the upper support and contacts with the roller in a form of rolling friction. The connecting device connects the angle adjustment device slidably with the upper support. The angle adjustment of the video display device is accomplished by adjusting the relative angular position of the angle adjustment device with respect to the upper support.

3 Claims, 4 Drawing Sheets

DIRECTION AND AN ANGLE ADJUSTMENT APPARATUS FOR A VIDEO DISPLAY DEVICE

TECHNICAL FIELD OF THE INVENTION

The invention relates in general to a direction and an angle adjustment apparatus for a video display device, e.g. monitor.

BACKGROUND OF THE INVENTION

When a new user begins to use a video display device original adjusted particularly to meet the need of the former user, it is generally needed to adjust the angle or direction of the video display apparatus because of different physical dimensions of the users. The user will not be easily tired if an accurate angle or direction of the video display device corresponding to his physical dimension is selected.

It has been known the movable members of angle or direction adjustment apparatus of the conventional types for a video display device contact with each other in a form of sliding friction. In other words, when adjustment of the angle or direction of the video display device is to be made, the user must exert force on the adjustment apparatus to overcome the sliding friction between the movable members. The mechanism of the type of the conventional art only suits for monitors of smaller size, e.g. sizes below 15 inches, having a lighter weight.

With the advent of the larger size monitors, the conventional approach does not meet the needs of heavier monitors any longer. The monitors of heavier weight make the adjustment of the angle or direction of the video display device difficult.

SUMMARY OF THE INVENTION

To the shortcomings of the conventional approaches for the larger size monitors recited above, the present invention provides an adjustment apparatus in which the movable members contact with each other in a form of rolling friction. The rolling friction is known to be smaller than the sliding friction when other parameters being the same. The angle or direction adjustment apparatus provided may therefore be adjusted by only a smaller external force applied by the user compared to the conventional approaches.

The direction adjustment apparatus for a video display device comprises an upper support and a lower support. The upper support has a bottom which has a plurality of cavities each of which accommodates a roller. The lower support is rotationally connected to the upper support. The lower support has at least a circular guide rail for seating and guiding the roller. The weight of the video display device is transmitted to the circular guide rail of the lower support through the upper support and the roller. And when the upper support is rotated as a result of the direction adjustment of the video display device, the roller is rolling within the circular guide rail of the lower support.

The angle adjustment apparatus for a video display device comprises an upper support, an angle adjustment device and a connecting device. The upper support has a top of a concave shape which has a plurality of cavities each of which accommodates a roller. The angle adjustment device has a corresponding bottom of a convex shape which is seated on the roller of the upper support and contacts with the roller in a form of rolling friction. The connecting device connects the angle adjustment device slidably with the upper support. The angle adjustment of the video display device is accomplished by adjusting the relative angular position of the angle adjustment device with respect to the upper support.

The utility and characteristic of the invention may be further understood with the following recitation on the invention accompanied by the appended drawings.

DETAILED DESCRIPTION OF THE PRESENT INVENTION

Figure 1:
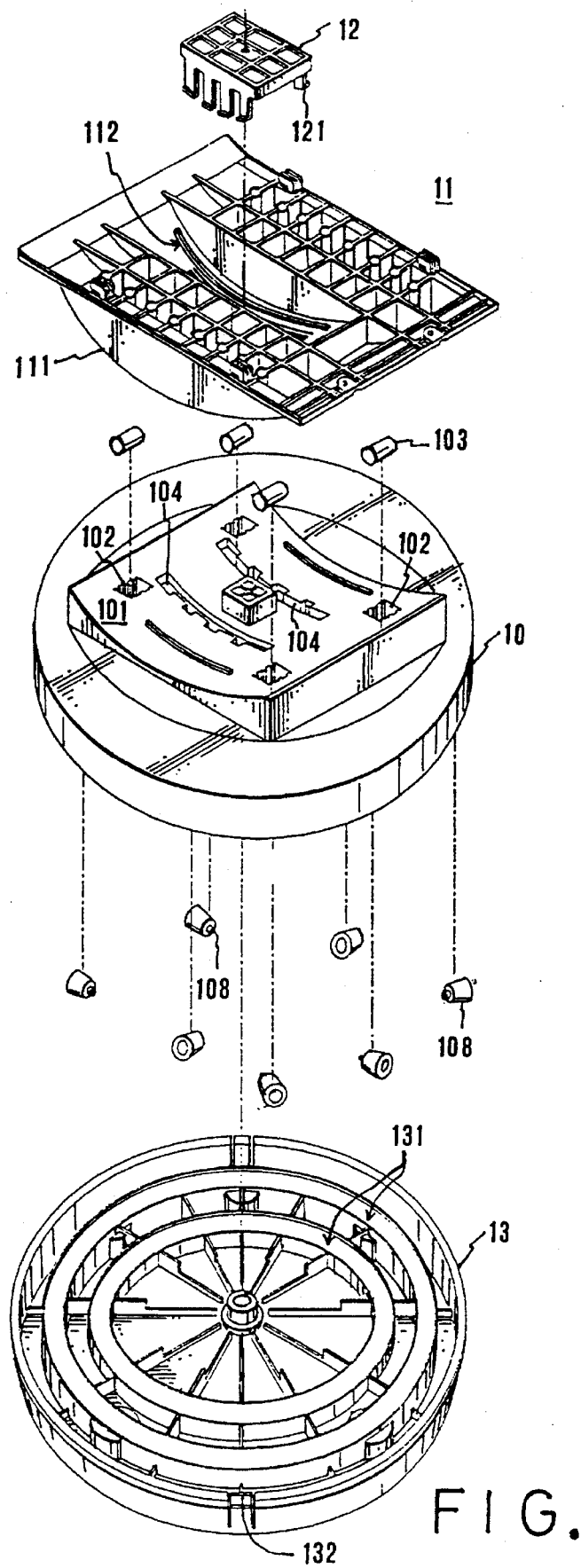
FIG. 1 shows an explosion view of the members of the invention.

As shown in FIG. 1, the angle adjustment apparatus of the invention comprises an upper support 10, an angle adjustment device 11 and a connecting device 12.

Figure 3:
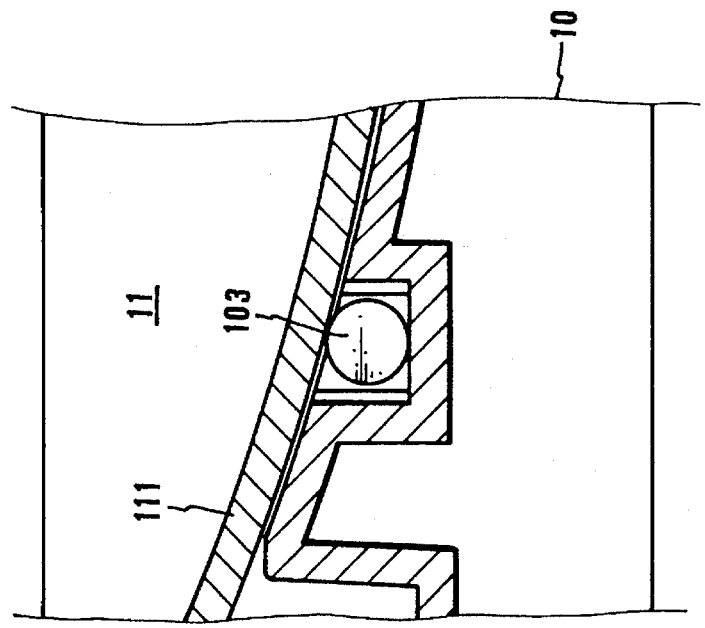
FIG. 3 shows a section view of the angle adjustment device being seated on the upper support of the invention.

The upper support 10 has a top 101 of a concave shape. The top 101 has a plurality of cavities 102 each of which accommodates a roller 103. As the roller 103 is placed inside the cavity 102, a small portion of the surface of the roller 103 protrudes, as shown in FIG. 3. The upper support 10 has, near the substantially central area, a first opening 104.

The angle adjustment device 11 has a bottom 111 of a corresponding convex shape. The bottom 111 is seated on the roller 103 and contacts with the roller 103 in a form of rolling friction, as shown in FIG. 3. The bottom 111 has, near the substantially central area, a corresponding second opening 112.

The connecting device 12 has a plurality of cantilever arms 121 which pass through the second opening 112 and then the first opening 104 to connect the angle adjustment device 11 slidably with the upper support 10. The perspective views of the connection relationship at the moment before and after the connecting device 12 is engaged with the upper support 10 are shown respectively in FIG. 6 and 7.

Figure 6:
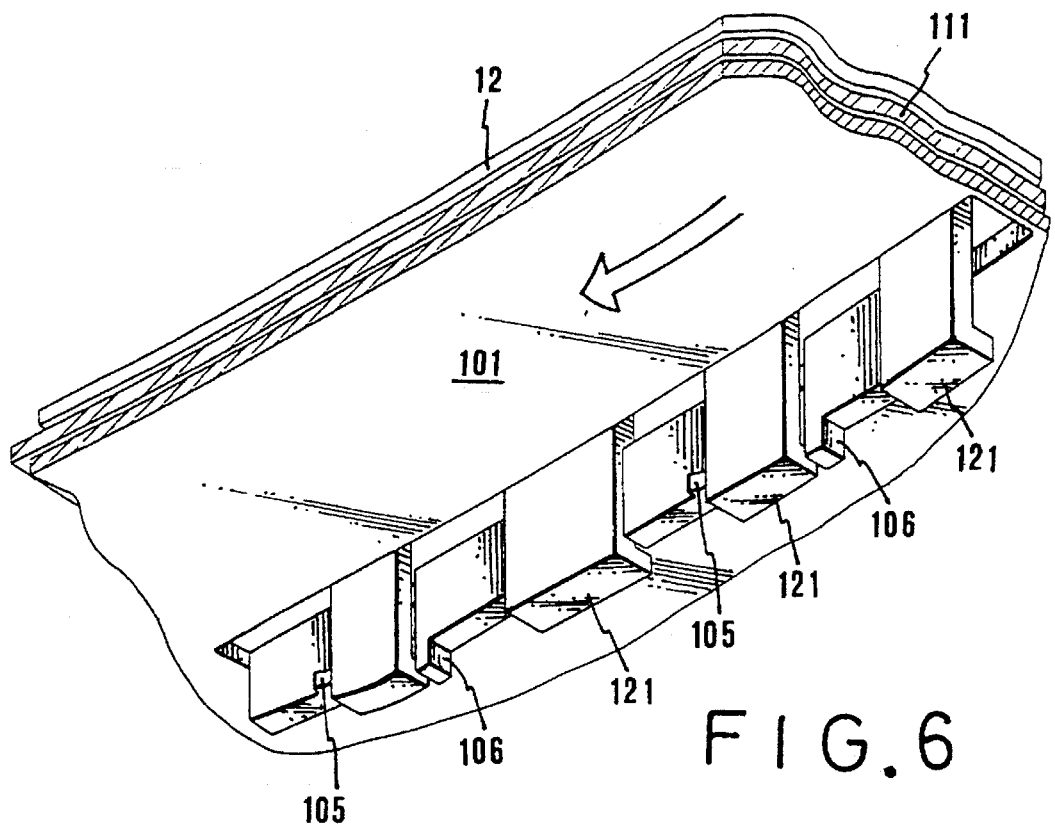
FIG. 6 shows a perspective view of the connection of the connecting device with the upper support of the invention before engagement.
Figure 7:
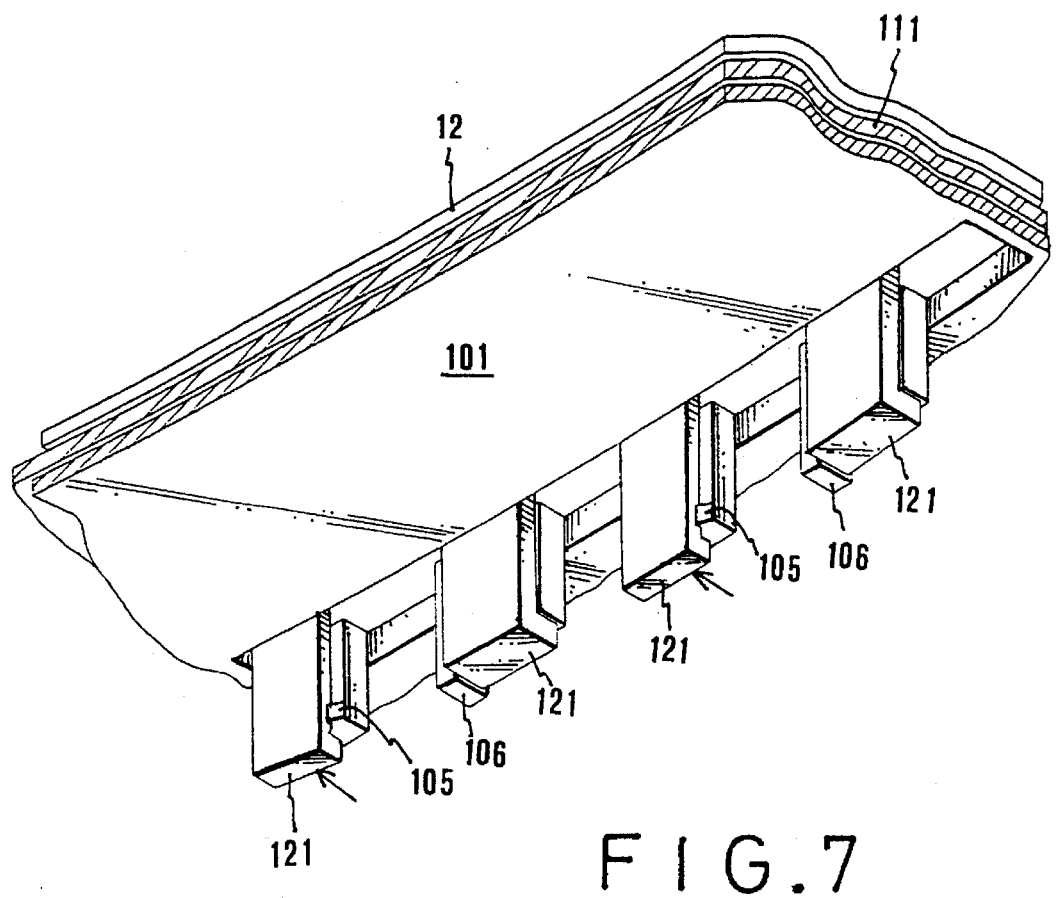
FIG. 7 shows a perspective view of the connection of the connecting device with the upper support of the invention while engaged to each other.

As shown in FIG. 6 and FIG. 7, the upper support 10 has a retainer block 106 and protrusion 105 for engaging with the cantilever arm 121 of the connecting device 12. As the connecting device 12 is pushed to its engagement position in a direction shown in FIG. 6, the cantilever arm 121 passes over the protrusion 105 because of a lateral force from the protrusion 105. And the final engagement position will be that shown in FIG. 7. The protrusion 105 is used to prevent the backward movement of the cantilever arm 121. The retainer block 106 prevents any further forward movement of the cantilever arm 121.

The cantilever arm 121 has to be pressed in a direction as shown by the arrow in FIG. 7 to disengage with the protrusion 105 first, and, at the same time, the connecting device 12 is pushed in an opposite direction of the engagement process shown in FIG. 6 to disconnect the connecting device 12 from the upper support 10.

As shown in FIG. 3, after the attachment of the angle adjustment device 11 with the upper support 10, the angle adjustment device 11 is seated on the roller 103 and contacts with the roller 103 in a form of rolling friction.

As shown in FIG. 1, the direction adjustment apparatus of the invention comprises a upper support 10 and a lower support 13.

Figure 2:
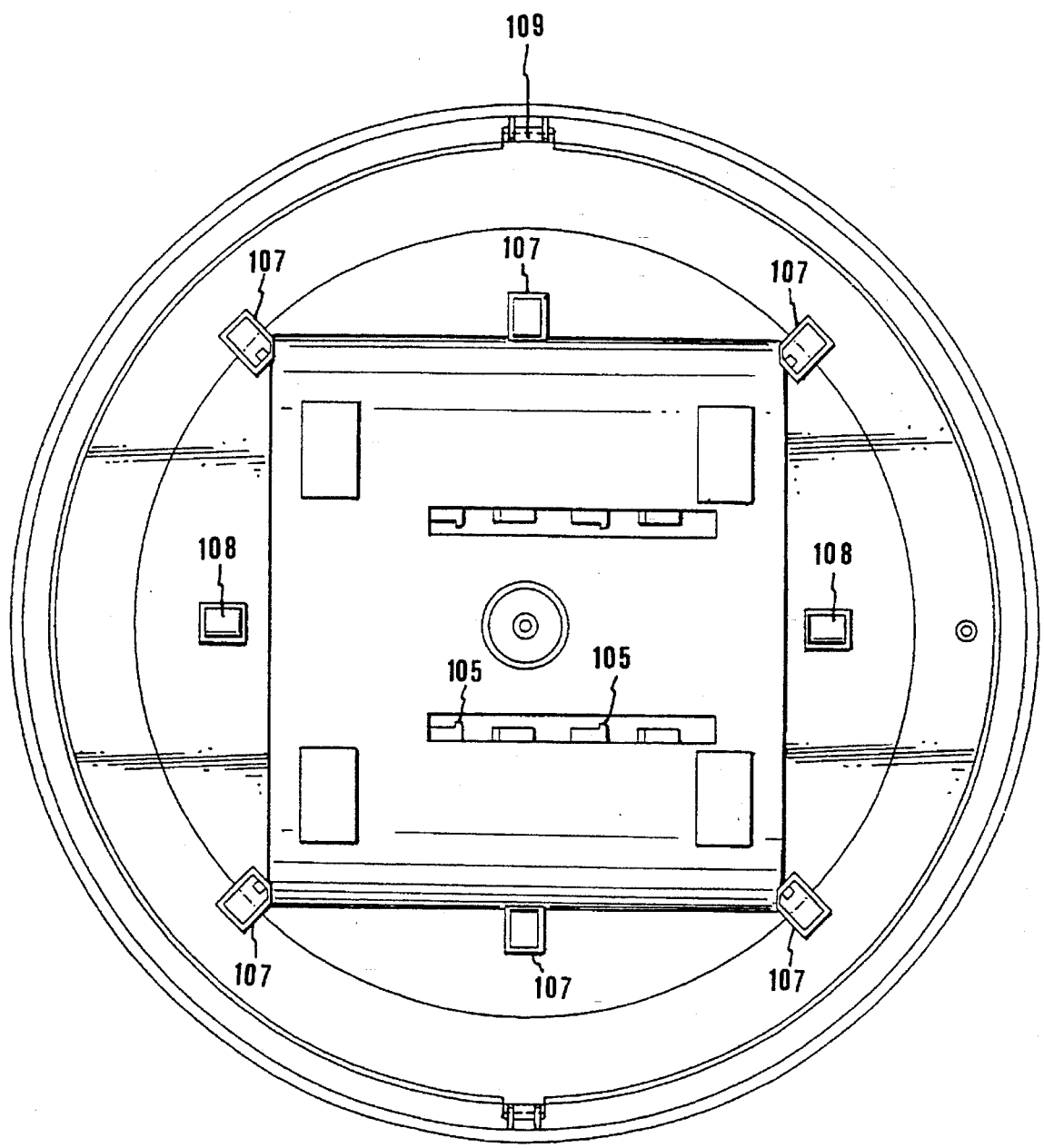
FIG. 2 shows a bottom elevation of the upper support of the invention.

The upper support 10 has a bottom which has a plurality of cavities 107 each of which accommodates a roller 108, as shown in FIG. 2. The lower support 13 is rotationally connected to the upper support 10 and has at least an circular guide rail 131 for seating and guiding the roller 108 within the cavity 107. When the upper support 10 is rotated as a result of the direction adjustment of the video display device, the roller 108 rolls within the circular guide rail 131. After the assembly of the direction adjustment apparatus, the weight of the upper support 10 is transmitted to the guide rail 131 as shown in FIG. 4.

Figure 5:
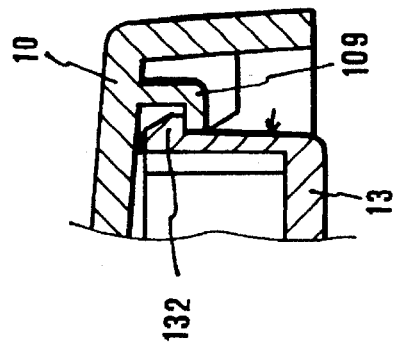
FIG. 5 shows a section view of the connection members of the upper and lower support in which they are aligned and engaged to each other.

The bottom of the upper support 10 has a retainer 109 and the lower support 13 has a corresponding cantilever arm 132. Aligning the retainer 109 to cantilever arm 132 and engaging one with another first as shown in FIG. 5, and rotating one of these members afterwards connects the upper support 10 and lower support 13 rotationally. In other words, they are connected to each other and only relative rotational movement between them is allowed.

In order to disconnect the upper support 10 from lower support 13, first rotate one of these members such that the retainer 109 and cantilever arm 132 are aligned to each other. Push the cantilever arm 132 in a direction shown in FIG. 5 completes the detachment of the retainer 109 from the cantilever arm 132. The upper support 10 and lower support 13 is detached from each other thereafter.

Figure 4:
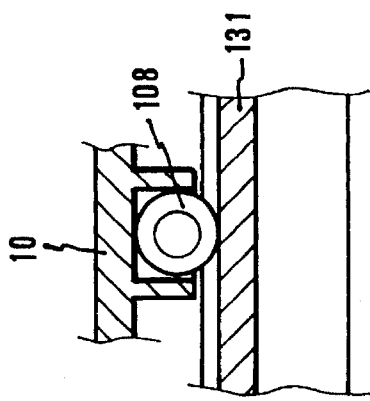
FIG. 4 shows a section view of the upper support and the roller being seated on the lower support of the invention.

During the direction adjustment of the video display device, the roller 108 is rolling on the guide rail 131 of the lower support 13, as shown in FIG. 4, which results in a smaller friction than the sliding friction. The user only needs to apply a smaller amount of force to make the adjustment.

While the purpose of the invention is proposed for the monitors of large size, the invention, however, is still applicable well to the monitors of smaller size.

The detailed description of the invention recited above is only for illustrative, rather than limiting purpose. Therefore, not only the above preferred embodiment of the invention, but the equivalence thereof are intended scope of the protection of the invention which is defined by the following claims.

What is claimed is:

1. An angle adjustment apparatus for a video display device, comprising:

an upper support having a top of a concave shape, the top having a plurality of cavities each of which accommodates a roller;

angle adjustment means having a bottom of a convex shape, the bottom being seated on each said roller of said upper support, each roller having a rolling surface contacting an inner surface of a corresponding one of the cavities and contacting said bottom to produce rolling friction;

means for slidably connecting said angle adjustment means with said upper support;

whereby the angle adjustment of the video display device is accomplished by adjusting the relative angular position of said angle adjustment means with respect to said upper support.

2. The apparatus recited as claim 1, wherein said angle adjustment means has a first opening for the passage of a cantilever arm of said connecting means.

3. The apparatus recited as claim 2, wherein said upper support has a first opening for the passage of a cantilever arm of said connecting means.

* * * * *